United States Patent
Drake et al.

(10) Patent No.: US 8,519,883 B2
(45) Date of Patent: Aug. 27, 2013

(54) ADJUSTING THE SENSITIVITY OF A PIR SENSOR OR A DOPPLER RADAR SENSOR DISPOSED WITHIN A LIGHT FIXTURE

(75) Inventors: George Michael Drake, Newman, GA (US); Ryan Crist, Jefferson, WI (US); Tyler Fleig, Fort Atkinson, WI (US); Milton Dallas, East Troy, WI (US); Scott Kroeger, Mequon, WI (US); Norm Siegel, Hales Corners, WI (US); Charlie Ketelhohn, Cedarburg, WI (US)

(73) Assignee: Cooper Technologies Company, Houston, TX (US)

( * ) Notice: Subject to any disclaimer, the term of this patent is extended or adjusted under 35 U.S.C. 154(b) by 0 days.

(21) Appl. No.: 13/561,612

(22) Filed: Jul. 30, 2012

(65) Prior Publication Data
US 2012/0293076 A1    Nov. 22, 2012

Related U.S. Application Data

(63) Continuation of application No. 12/570,914, filed on Sep. 30, 2009, now Pat. No. 8,232,909.

(60) Provisional application No. 61/101,396, filed on Sep. 30, 2008.

(51) Int. Cl.
*G01S 13/04* (2006.01)
*G01S 13/86* (2006.01)
*G01S 13/88* (2006.01)
*G01S 13/00* (2006.01)

(52) U.S. Cl.
USPC ............... 342/28; 362/257; 362/276; 342/27; 342/61; 342/66; 342/175; 342/195; 340/500; 340/540; 340/541; 340/552; 340/554

(58) Field of Classification Search
USPC ........... 342/27, 28, 41, 52–58, 61, 66, 69–74, 342/89–93, 175, 195; 340/500, 540, 541, 340/545.1, 545.2, 545.3, 552–554, 565, 567; 362/257, 276, 382, 394; 701/300, 301; 431/18, 431/24; 102/530, 531; 315/149–159, 363; 700/90, 286; 250/336.1, 338.1, 340, 342
See application file for complete search history.

(56) References Cited

U.S. PATENT DOCUMENTS

| | | | |
|---|---|---|---|
| 2,649,538 A | 8/1953 | Marlowe et al. | |
| 3,343,167 A | 9/1967 | Rademacher | |

(Continued)

FOREIGN PATENT DOCUMENTS

GB    2279791    6/1986

*Primary Examiner* — Bernarr Gregory
(74) *Attorney, Agent, or Firm* — King & Spalding LLP

(57) ABSTRACT

A motion detector system includes the ability to detect motion through the use of a Doppler radar sensor or a combination of PIR sensors and a Doppler radar sensor. The system includes an outdoor light fixture having one or more lamps and a housing coupled to the outdoor light fixture. The housing includes a Doppler radar sensor and a microprocessor for analyzing the signals received by the Doppler radar sensor. Alternatively, the housing includes a combination of PIR sensors and a Doppler radar sensor and a microprocessor for analyzing the signals received from these sensors. The lamps in the light fixture are activated when either the PIR sensor or the Doppler radar sensor generates a signal indicating motion within the monitored area. Alternatively, the lamps can be activated when either the PIR sensor or the Doppler radar sensor senses predetermined number of motion activities over a limited time period.

20 Claims, 8 Drawing Sheets

(56) References Cited

U.S. PATENT DOCUMENTS

| | | | | |
|---|---|---|---|---|
| 3,683,379 | A | 8/1972 | Saddler et al. | |
| 3,689,882 | A | 9/1972 | Dessailly | |
| 3,786,507 | A | 1/1974 | Hurd | |
| 3,810,172 | A | 5/1974 | Burpee et al. | |
| 3,964,394 | A | 6/1976 | Wolf | |
| 4,031,534 | A | 6/1977 | Kallmann et al. | |
| 4,527,151 | A | 7/1985 | Byrne | |
| 4,631,516 | A | 12/1986 | Clinker | |
| 4,697,184 | A | 9/1987 | Cheal et al. | |
| 4,807,101 | A | 2/1989 | Milde | |
| 4,820,938 | A | 4/1989 | Mix et al. | |
| 4,857,912 | A | 8/1989 | Everett et al. | |
| 4,902,906 | A * | 2/1990 | Murphy | 315/159 |
| 5,182,502 | A * | 1/1993 | Slotkowski et al. | 315/159 |
| 5,258,899 | A | 11/1993 | Chen | |
| 5,329,206 | A * | 7/1994 | Slotkowski et al. | 315/159 |
| 5,357,170 | A * | 10/1994 | Luchaco et al. | 315/159 |
| 5,381,323 | A | 1/1995 | Osteen et al. | |
| 5,386,210 | A | 1/1995 | Lee | |
| 5,430,450 | A | 7/1995 | Holmes | |
| 5,506,715 | A * | 4/1996 | Zhu | 315/149 |
| 5,578,988 | A | 11/1996 | Hoseit et al. | |
| 5,637,964 | A * | 6/1997 | Hakkarainen et al. | 315/149 |
| 5,649,761 | A | 7/1997 | Sandell et al. | |
| 5,662,411 | A | 9/1997 | Haslam et al. | |
| 5,699,243 | A * | 12/1997 | Eckel et al. | 315/159 |
| 5,909,087 | A * | 6/1999 | Bryde et al. | 315/149 |
| 5,936,524 | A | 8/1999 | Zhevelev et al. | |
| 5,984,513 | A * | 11/1999 | Baldwin | 700/286 |
| 6,023,224 | A * | 2/2000 | Meyvis | 315/153 |
| 6,057,797 | A | 5/2000 | Wagner | |
| 6,069,561 | A | 5/2000 | Schopf et al. | |
| 6,091,200 | A | 7/2000 | Lenz | |
| 6,100,803 | A | 8/2000 | Chang | |
| 6,175,309 | B1 | 1/2001 | Drake et al. | |
| 6,191,688 | B1 | 2/2001 | Sprouse | |
| 6,206,340 | B1 | 3/2001 | Paese et al. | |
| 6,252,525 | B1 | 6/2001 | Philiben | |
| 6,263,282 | B1 | 7/2001 | Vallancourt | |
| 6,340,864 | B1 * | 1/2002 | Wacyk | 315/158 |
| 6,388,609 | B2 | 5/2002 | Paese et al. | |
| 6,426,716 | B1 | 7/2002 | McEwan | |
| 6,459,476 | B2 | 10/2002 | Nishimura | |
| 6,465,963 | B1 * | 10/2002 | Turnbull et al. | 315/157 |
| 6,486,825 | B1 | 11/2002 | Smithey | |
| 6,568,655 | B2 | 5/2003 | Paese et al. | |
| 6,677,887 | B2 | 1/2004 | Harman | |
| 6,741,176 | B2 * | 5/2004 | Ferraro | 340/567 |
| 6,759,954 | B1 | 7/2004 | Myron et al. | |
| 6,791,458 | B2 | 9/2004 | Baldwin | |
| 6,819,239 | B2 | 11/2004 | Bingham | |
| 6,872,948 | B2 * | 3/2005 | Lee | 250/342 |
| 6,894,609 | B2 | 5/2005 | Menard et al. | |
| 6,927,541 | B2 * | 8/2005 | Lee | 315/159 |
| 6,963,180 | B2 * | 11/2005 | Rose | 315/153 |
| 7,164,110 | B2 * | 1/2007 | Pitigoi-Aron et al. | 315/150 |
| 7,165,864 | B2 | 1/2007 | Miller | |
| 7,242,305 | B2 | 7/2007 | Cuddihy et al. | |
| 7,271,543 | B1 * | 9/2007 | Goldstein | 315/153 |
| 7,283,048 | B2 | 10/2007 | Stilp | |
| 7,284,880 | B1 | 10/2007 | Steele | |
| 7,339,471 | B1 * | 3/2008 | Chan et al. | 315/159 |
| 7,439,902 | B2 | 10/2008 | Robertson et al. | |
| 2002/0135476 | A1 | 9/2002 | McKinney et al. | |
| 2004/0135885 | A1 | 7/2004 | Hage | |
| 2006/0125624 | A1 | 6/2006 | Ostrovsky et al. | |
| 2006/0286495 | A1 * | 12/2006 | Roussel | 431/24 |
| 2007/0040676 | A1 | 2/2007 | Bandringa et al. | |
| 2008/0094210 | A1 | 4/2008 | Paridiso et al. | |

* cited by examiner

ADJUSTING THE SENSITIVITY OF A PIR SENSOR OR A DOPPLER RADAR SENSOR DISPOSED WITHIN A LIGHT FIXTURE

CROSS-REFERENCE TO RELATED APPLICATIONS

This patent application is a continuation of and claims priority under U.S.C. §120 to U.S. patent application Ser. No. 12/570,914, entitled "Doppler Radar Motion Detector for an Outdoor Light Fixture," filed Sep. 30, 2009 now U.S. Pat. No. 8,232,909; which claims priority under 35 U.S.C. §119 to U.S. Provisional Patent Application No. 61/101,396, entitled "Doppler Radar Motion Detector for an Outdoor Light Fixture," filed Sep. 30, 2008, the entirety of both which is incorporated by reference herein.

FIELD OF THE INVENTION

The present invention relates to the field of motion detection in an outdoor environment. More specifically, the invention relates to apparatus and methods for using Doppler radar in a motion detection application for an outdoor light fixture.

BACKGROUND

Traditional motion-sensing products use passive infrared (PIR) sensors to recognize moving heat sources, such as people, animals, or car engines. PIR sensors have been the standard technology used in outdoor motion-sensing products for years, and the effectiveness of PIR sensors is typically determined by the design of the motion-sensing apparatus, the quality of the components used in making the motion sensing apparatus, and the current weather conditions. Rain, and wind-blown leaves and branches cause false positives, or false tripping, of a typical PIR motion sensor. Further, the typical PIR motion sensor performs differently in heat than it does in cold. Therefore, depending on where a user lives geographically, climate can have an effect on the performance of the PIR motion sensor and accordingly the fixture. In cold climates people are generally wearing insulated coats. The outer surface of the coat can be a similar temperature to the surrounding environment, thereby making it difficult to detect a person's motion. On the other hand, in warm climates, a person body temperature while walking across a paved driveway may be the same temperature or substantially close to the same temperature as the pavement, thereby making it difficult for the PIR sensors to detect motion.

Another problem with conventional motion sensors is that a person can walk straight towards the conventional PIR-based motion sensor and the motion sensor will not detect motion until the motion is occurring immediately in front of the sensor. This is due to the radial detection zones that are relied upon by the PIR sensor's lens optics. These radial detection zones extend out from the center of the sensor into the detection area and only allow motion to be detected by the sensor when a temperature change is found in one of the zones. For example, if a person walks directly toward the sensor and does not move from one zone to the next, the person will not be detected because the temperature remains the same in that zone. As the person gets closer to the sensor the zone gets smaller and smaller until it is impossible to keep from crossing to the next zone.

Further, the present invention overcomes the problems associated with merely moving standard Doppler radar, that may be used in an indoor environment, to an outdoor environment. For example, if a typical indoor Doppler radar system is used in an outdoor application, without the benefit of the present invention, the system will detect motion of any object moving towards the unit, including dirt, leaves, bugs, and the like, resulting in wanted and unwanted motion detection. Leaves or other objects blowing around will cause a typical indoor Doppler radar system to activate. Detecting this type of motion is considered a "false tripping" condition for an outdoor motion detector and would be objectionable to the consumer because, for example, a light would be activated in the middle of the night even though no person is in the area.

The present invention overcomes these problems caused by environmental weather conditions that either cause "false tripping" or "no-tripping" conditions in traditional motion sensors through the addition of a Doppler radar, which can make a decision about whether motion has been detected based on information provided by the Doppler radar sensor or a combination of information provided by the Doppler radar sensor and the PIR sensors.

SUMMARY OF THE INVENTION

According to one embodiment of the invention, a motion detector system for monitoring motion within a monitored area includes an outdoor light fixture, a Doppler radar sensor, and a microprocessor. The outdoor light fixture includes one or more lamps. The Doppler radar sensor is electrically coupled to the light fixture. The Doppler radar sensor emits a first signal to a monitored area and receives a second signal from the monitored area. The microprocessor is electrically coupled to the Doppler radar sensor and receives and analyzes the second signal to determine whether a Doppler alarm condition exists.

According to one embodiment of the invention, an outdoor motion detector system for monitoring motion within a monitored area includes an outdoor light fixture, a Doppler radar sensor, at least one passive infrared (PIR) sensor, and a microprocessor. The outdoor light fixture includes at least one lamp. The Doppler radar sensor is electrically coupled to the outdoor lighting fixture. The Doppler radar sensor emits a first signal to a monitored area and receives a second signal from the monitored area. The PIR sensor is electrically coupled to the outdoor light fixture. The PIR sensor receives infrared signals from the monitored area. The microprocessor is electrically coupled to the Doppler radar sensor and the PIR sensor. The microprocessor receives and analyzes the second signal to determine if a Doppler alarm condition exists and receives and analyzes the infrared signals to determine if a PIR alarm condition exists.

According to one embodiment of the invention, a method for detecting motion within a monitored area includes a lamp, a Doppler radar sensor, and a microprocessor. The microprocessor is electrically coupled to the lamp and the Doppler sensor. The Doppler sensor emits a first signal into the monitored area and receives a second signal from the monitored area. The microprocessor compares the first signal to the second signal and determines if a Doppler alarm condition exists.

BRIEF DESCRIPTION OF THE DRAWINGS

The foregoing and other features and aspects of the invention may be best understood with reference to the following description of certain exemplary embodiments, when read in conjunction with the accompanying drawings, wherein.

Figure 1:
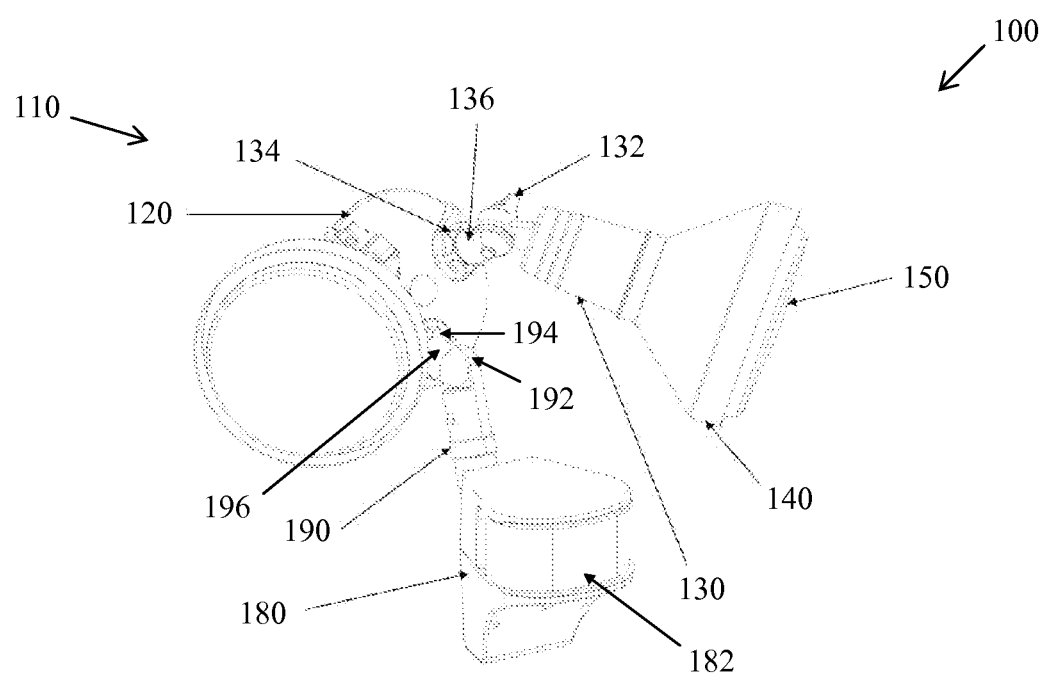
FIG. 1 is a perspective view of a motion detector system according to one exemplary embodiment of the present invention.

The drawings illustrate only exemplary embodiments of the invention and are therefore not to be considered limiting of its scope, as the invention may admit to other equally effective embodiments.

DETAILED DESCRIPTION OF THE EXEMPLARY EMBODIMENTS

The present invention relates to an apparatus and methods for motion detection in an outdoor environment. In particular, the invention relates to apparatus and methods for using Doppler radar in a motion detection application for an outdoor light fixture. The invention may be better understood by reading the following description of non-limiting, exemplary embodiments with reference to the attached drawings, wherein like parts of each of the figures are identified by like reference characters, and which are briefly described as follows.

In certain exemplary embodiments, the outdoor lighting device with motion sensing/detecting capability includes Doppler radar motion detection capability only. In other exemplary embodiments, the outdoor lighting device with motion sensing/detecting capability includes both Doppler radar and PIR sensors (hereinafter referred to as "dual technology"). The outdoor light fixture having only Doppler radar uses a proprietary microprocessor control logic which makes outdoor Doppler radar performance acceptable for the intended application.

FIG. 1 is a perspective view of a motion detector system 100 according to one exemplary embodiment of the present invention. Referring to FIG. 1, the motion detector system 100 includes an outdoor light fixture 110 and a combination Doppler radar and PIR motion sensor housing 180 coupled to the outdoor light fixture 110. The Doppler radar and PIR motion sensor housing 180 is coupled to the outdoor light fixture 110 using an extension arm 190.

The extension arm 190 includes a thumbscrew 192 for angle adjustment of the housing 180. Typically, the thumbscrew 192 is rotated in one direction to allow the housing 180 to be angularly adjusted. Once the desired angle is obtained, the thumbscrew 192 is rotated in the opposite direction to tighten and fix the angular position of the housing 180. The extension arm 190 also includes a locknut 194 and a threaded knuckle 196 for rotational adjustment of the housing 180 and for coupling the housing 180 to the outdoor light fixture 110.

The threaded knuckle 196 is threadedly inserted into a sensor housing opening (not shown) in a canopy 120. Once the extension arm 190 is appropriately positioned in the opening, the locknut 194 is rotated to tighten and fix the rotational position of the extension arm 190. Thus, the extension arm 190 is configured to allow the Doppler radar and PIR motion sensor housing 180 to be variably positioned three dimensionally. Although the extension arm 190 with the thumbscrew 192, the locknut 194, and the threaded knuckle 196 are used to variably position the Doppler radar and PIR motion sensor housing 180 and couple the housing 180 to the outdoor light fixture 110, other coupling devices known to people having ordinary skill in the art can be used to couple the housing to the outdoor light fixture and/or variably position the housing with respect to the outdoor light fixture without departing from the scope and spirit of the exemplary embodiment.

In certain exemplary embodiments, the Doppler radar and PIR motion sensor housing 180 is fabricated from a heavy duty plastic. In alternative exemplary embodiments, however, the housing 180 can be fabricated using any suitable material known to those having ordinary skill in the art. The exemplary housing 180 has one opening (not shown) that is directed towards the area to be monitored. This opening is typically covered by a lens 182 The lens 182 is an extra wide lens design and, in this exemplary embodiment, is fabricated using a translucent material. As shown in this exemplary embodiment, the lens 182 is fabricated using three lens pieces coupled together to form a lens array 183. In alternative exemplary embodiments, the lens 182 is fabricated using greater or fewer lens pieces coupled together.

The outdoor light fixture 110 includes a canopy 120, one or more lamp holders 130, a reflector 140 for each of the lamp holders 130, and a lamp 150 for insertion into each of the lamp holders 130. Although one exemplary embodiment of the outdoor light fixture 110 is described in detail, other types of outdoor light fixtures are included within the scope and spirit of the exemplary embodiment. The exemplary canopy 120 is a circular mounting structure used for mounting the motion detector system 100 to a suitable mounting structure and for coupling with the lamp holders 130 and the housing 180. According to this exemplary embodiment, the canopy 120 includes one or more lamp holder openings (not shown) and the sensor housing opening. As previously mentioned, the housing 180 is coupled to the canopy 120 by way of the sensor housing opening. The lamp holders 130 are coupled to the canopy 120 using the lamp holder openings. The canopy 120 is fabricated using a metal, a metal alloy, a polymer, or any other suitable material. Although the canopy 120 is depicted as being circular, the canopy can be any geometric or non-geometric shape without departing from the scope and spirit of the exemplary embodiment.

The lamp holders 130 are coupled to the canopy 120 using a threaded knuckle 136 and a locknut 134. Each lamp holder 130 includes one or more sockets (not shown) for coupling with the lamp 150. The threaded knuckle 136 is threadedly inserted into the lamp holder opening in the canopy 120. Once the threaded knuckle 136 is appropriately positioned in the opening, the locknut 134 is rotated to tighten and fix the rotational position of the threaded knuckle 136. The threaded knuckle 136 also includes a thumbscrew 132 to adjust the angle of the lamp holder 130. The thumbscrew 132 is rotated in one direction to allow the lamp holder 130 to be angularly adjusted. Once the desired angle is obtained, the thumbscrew 132 is rotated in the opposite direction to tighten and fix the angular position of the lamp holder 130. Thus, the threaded knuckle 136, thumbscrew 132, and the locknut 134 are configured to allow the lamp holder 130 to be variably positioned three dimensionally. Although the threaded knuckle 136 with the thumbscrew 132 and the locknut 134 are used to variably position the lamp holder 130 and couple the lamp holder 130 to the canopy 120, other coupling devices known to people having ordinary skill in the art can be used to couple the lamp holder to the canopy and/or variably position the lamp holder with respect to the canopy without departing from the scope and spirit of the exemplary embodiment.

The reflector 140 is coupled to the lamp holder 130. According to some exemplary embodiments, the reflector 140 and the lamp holder 130 are integrally formed. According to other exemplary embodiments, the reflector 140 and the lamp holder 130 are fabricated separately and thereafter coupled to one another. The lamp 150 is coupled to the socket in the lamp holder 130, such that the reflector 140 surrounds the lamp 150. The lamp 150 can be any type of lamp, including but not limited to, an incandescent lamp, a high intensity discharge (HID) lamp, a light emitting diode (LED) lamp, a halogen lamp, a fluorescent lamp, or any other suitable type of lamp. According to some exemplary embodiments, an optional lens (not shown) can be disposed adjacent to the lamp 150, so that the lamp 150 is protected from the environment. In one exemplary embodiment, the lens is disposed below the lamp 150. In certain exemplary embodiments, the lamp 150 is coupled to the lamp holder 130 so that the lamp 150 is contained within the lamp holder 130, the reflector 140, and the optional lens.

Figure 2:
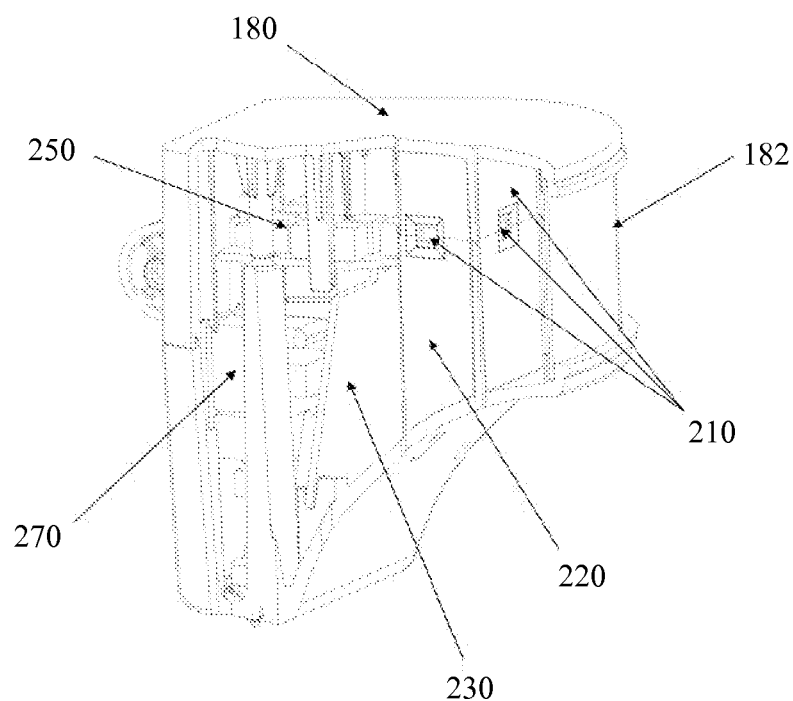
FIG. 2 is a cross-sectional view of a Doppler radar and PIR motion sensor housing according to one exemplary embodiment of the present invention.

FIG. 2 is a perspective, cross-sectional view of the Doppler radar and PIR motion sensor housing 180 according to one exemplary embodiment of the present invention. Referring now to FIG. 2, the exemplary Doppler radar and PIR motion sensor housing 180 includes the lens 182, one or more PIR sensors 210 coupled to a main circuit board 250, a circuit barrier 220, a Doppler radar board 230, and a processor circuit board 270. As previously mentioned, in one exemplary embodiment, the housing 180 is fabricated from a heavy duty plastic or any other suitable material known to those having ordinary skill in the art. The housing 180 has one opening (not shown) that is directed towards the area to be monitored. This opening is covered by a lens 182. In certain exemplary embodiments, the lens 182 is an extra wide lens design and is fabricated using a translucent material or any other suitable material known to those having ordinary skill in the art.

The PIR sensors 210 are coupled to a main circuit board 250 and are typically oriented so that the PIR sensors 210 are located behind the lens 182. The exemplary PIR sensors 210 are positioned in the focal point of the lens array 183. The PIR sensors 210 measure infrared (IR) light radiating from objects in a field of view. Apparent motion is detected when an infrared source with one temperature passes in front of an infrared source with another temperature. According to this exemplary embodiment, three PIR sensors 210 are positioned within the housing 180 behind the lens 182. Multiple PIR sensors can be used in some exemplary motion detector systems for enhancing the motion detection capability. In alternative exemplary embodiments, the number of PIR sensors 210 can be greater or fewer without departing from the scope and spirit of the exemplary embodiment. The exemplary PIR sensors 210 are fabricated using technology known to those having ordinary skill in the art.

The exemplary circuit barrier 220 is a physical barrier that provides safety to a person from the internal components within the housing 180 and acts as a water barrier between the outside environment and the internal electrical components positioned within the housing 180. The circuit barrier 220 is provided between the lens 182 and the internal electrical components positioned within the housing 180. In one exemplary embodiment, the circuit barrier 220 is molded integrally with the housing 180; however, other exemplary embodiments include the circuit barrier being molded as a separate component from the housing 180. In one exemplary embodiment, the circuit barrier 220 is fabricated from the same material as the housing 180. Alternatively, the circuit barrier 220 is fabricated from other flame resistant and shock resistant materials, such as a metal enclosure, without departing from the scope and spirit of the exemplary embodiment.

The Doppler radar board 230, the main circuit board 250, and the processor circuit board 270 are positioned within the housing 180. The Doppler radar board 230 includes a Doppler radar sensor (not shown) having one or more antennas (not shown) for transmitting and receiving signals to and from the monitored area. The Doppler radar sensor makes use of the Doppler effect to produce data about objects at a distance. The Doppler radar sensor does this by beaming a microwave signal towards a desired target and waiting for its reflection signal, then analyzing how the original signal has been altered by the object(s) that reflected it. Variations in the frequency of the signal give direct and highly accurate measurements of a target's velocity relative to the Doppler radar sensor and the direction of the microwave beam. A microprocessor (not shown) is positioned on the processor circuit board 270 and receives and analyzes signals from the PIR sensors 210 on the main circuit board 250 and the Doppler radar sensor on the Doppler radar board 230.

Figure 3:
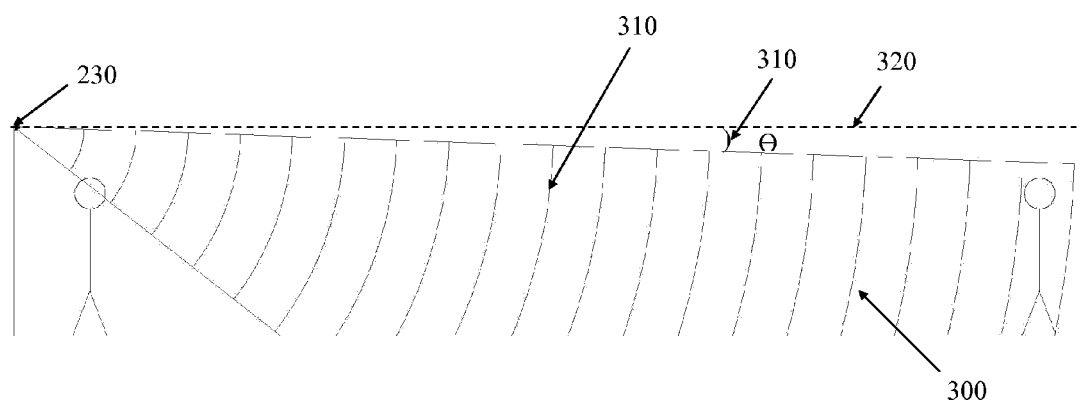
FIG. 3 is a representative sketch of the monitored area for the Doppler radar sensor of FIGS. 1 and 2 according to one exemplary embodiment of the present invention.

FIG. 3 is a representative sketch of the monitored area 300 for the outdoor light fixture's 110 Doppler radar sensor of FIGS. 1 and 2 according to one exemplary embodiment of the present invention. As can be seen in FIGS. 2 and 3, in certain exemplary embodiments, the Doppler radar board 230 is positioned at a downward angle for improved motion detection coverage. In one exemplary embodiment, the downward angle 310 is approximately a 10-degree down angle from the horizontal 320; however, the angle could be adjusted anywhere between 0-90 degrees down from the horizontal 320 depending upon the desired range of the monitored area 300. Positioning the Doppler radar board 230 at a downward angle helps detect motion at a very close range without correspondingly losing far range detection capabilities. However, positioning the Doppler radar board 230 at an angle is not required for the motion detector system 100 to function properly.

Figure 4:
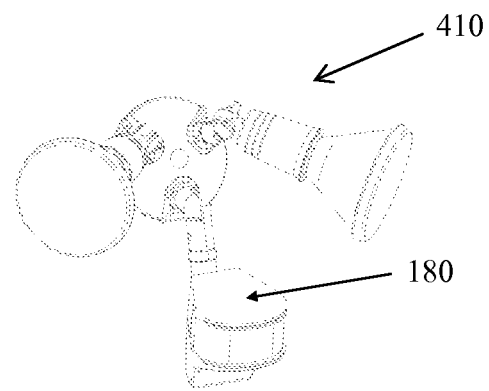
FIGS. 4-6 are perspective views of the combination Doppler radar and PIR motion sensor housing coupled to additional versions of outdoor lighting fixtures according to alternative exemplary embodiment of the present invention.
Figure 5:
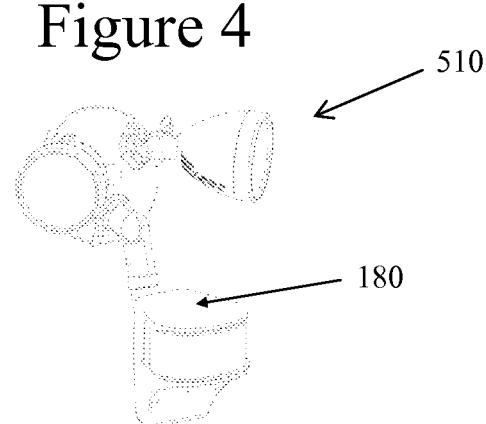
Figure 6:
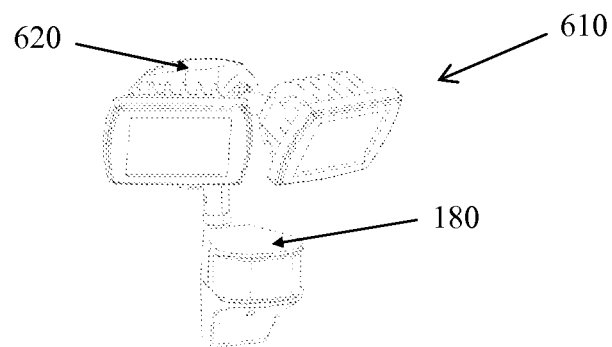

FIGS. 4-6 are perspective views of the combination Doppler radar and PIR motion sensor housing 180 coupled to additional versions of outdoor lighting fixtures 410, 510, and 610 according to alternative exemplary embodiments of the present invention. These are but a few of the different alternative exemplary embodiments. In yet another alternative embodiment, the Doppler and Doppler/PIR dual technology motion sensors are incorporated into lighting lanterns and lantern fixtures (not shown). Outdoor lighting fixtures 410, 510, and 610 are similar to the outdoor light fixture 110 except for the types of lamp head design, reflectors, and/or lamps used. As previously mentioned, the types of lamps, include but are not limited to, incandescent lamps, high intensity discharge (HID) lamps, light emitting diodes (LED) lamps, halogen lamps, fluorescent lamps, or any other suitable type of lamp. Additionally, the outdoor lighting fixture 610 includes a canopy 620 having a different geometric shape than canopy 120 of outdoor light fixture 110. The canopy 620 is oval-shaped; however, other geometric or non-geometric shapes can be used for the canopy without departing from the scope and spirit of the exemplary embodiment.

Figure 7:
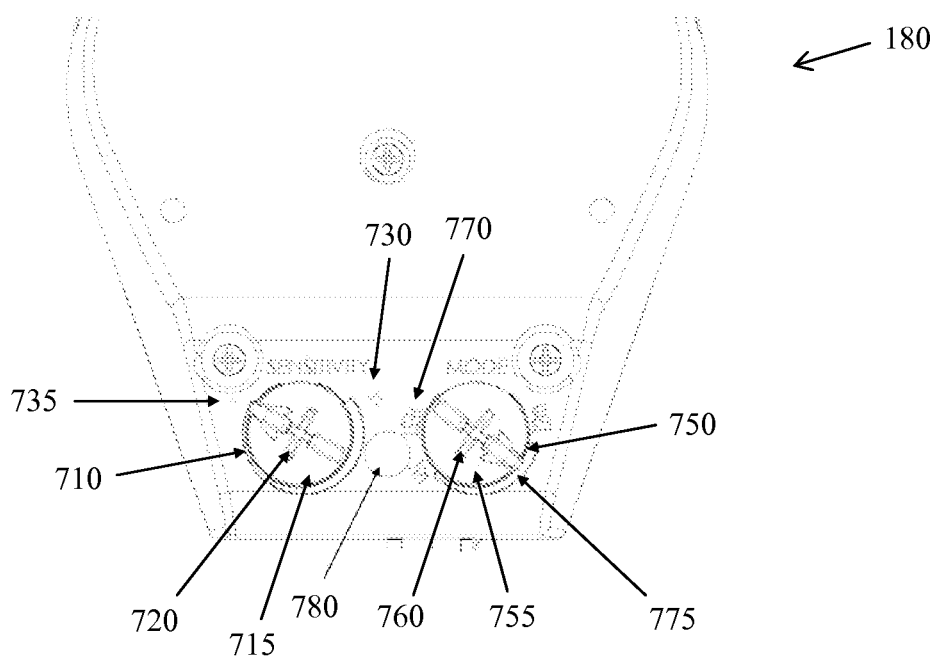
FIG. 7 is a bottom view of the Doppler radar and PIR motion sensor housing of FIG. 1 according to one exemplary embodiment of the present invention.

FIG. 7 is a bottom view of the Doppler radar and PIR motion sensor housing 180 of FIG. 1 according to one exemplary embodiment of the present invention. Referring now to FIG. 7, the exemplary housing 180 includes a sensitivity setting control knob 710 and mode setting control knob 750 positioned along the bottom of the housing 180. Positioning the control knobs 710 and 750 along the bottom of the housing 180 provides easier access for a consumer using the motion detector system 100 because the motion detector system 100 is usually installed overhead. Alternatively, control knobs 710 and 750 have another shape or form, such as a sliding switch or a push button, and are positioned along other portions of the housing 180 or other portions of the outdoor light fixture 110 in general. According to the exemplary embodiment shown in FIG. 7, the control knobs 710 and 750 are adjusted by rotating, either clockwise or counter-clockwise, as the situation requires. Further, in this exemplary embodiment, the sensitivity setting control knob 710 includes a receptacle 720 along its outer-looking face 715, which is capable of receiving a Philips-head or other known type of screwdriver, thereby facilitating the adjustment of the sensitivity setting control knob 710. Similarly, the mode setting control knob 750 includes a receptacle 760 along its outer-looking face 755, which is capable of receiving a Philips-head or other known type of screwdriver, thereby facilitating the adjustment of the mode setting control knob 750.

The exemplary sensitivity setting control knob 710 of FIG. 7 is indicated by a "+" 730 and "−" 735 at each end of the rotational range. In one exemplary embodiment, the adjustment for the sensitivity setting control knob 710 is infinite in between the "+" 730 and "−" 735 setting and is used to control the microprocessor's interpretation of the signal received. A lower sensitivity setting, turning the sensitivity setting control knob 710 towards the "−" 735 sign, reduces the distance at which motion is detected. When the exemplary sensitivity setting control knob 710 is pointing towards the "−" 735 position the motion detector system 100 is operating at the lowest sensitivity. Conversely, when the exemplary sensitivity setting control knob 710 is in the "+" 730 position the motion detector system 100 is operating at the maximum sensitivity.

The exemplary mode setting control knob 750 of FIG. 7 includes a test mode 770, where the motion detector system 100 can operate day or night but the lamp 150 stays on for only a few seconds when motion is detected. In one exemplary embodiment, the test mode 770 is typically used during the initial setup of the motion detector system 100 for aiming purposes. Thus, a user is able to move around the monitored area to verify the sensitivity of the motion detector system 100 and iteratively adjust the sensitivity setting control knob 710 until the desired sensitivity is achieved. The "1 m through 12 m" night time settings 775 represent the ability to adjust the period that the lamp 150 stays on once motion is detected. In one exemplary embodiment, the range is between one minute and twelve minutes in the example of FIG. 7. However, other time periods between 1 second and 1 hour are contemplated and within the scope of the present invention. In one exemplary embodiment, the motion detector portion of the motion detector system 100 only detects motion and activates the lamp 150 when motion is detected during the period from dusk to dawn and when a range within the "1 m to 12 m" night time settings 775 is selected.

The exemplary housing 180 of FIG. 7 further includes a clear lens 780 located in between the two control knobs 710 and 750, which is used to protect and hold the cadmium sulfide (CdS) photocell (not shown) in position. The CdS photocell is positioned adjacent the clear lens 780. The CdS photocell is used to determine light levels in order that a determination is made as to whether it is day or night, and is found in most common motion detectors. Although a CdS photocell is used to determine light levels, other devices and/or photocells that can determine light levels, for example a clock, can be used without departing from the scope and spirit of the exemplary embodiment. In one exemplary embodiment, the clear lens 780 is positioned along the bottom of the housing 180; however, the clear lens 780 could alternatively be positioned along other portions of the housing 180 or other portions of the outdoor light fixture 110 without departing from the scope and spirit of the exemplary embodiment.

Figure 8:
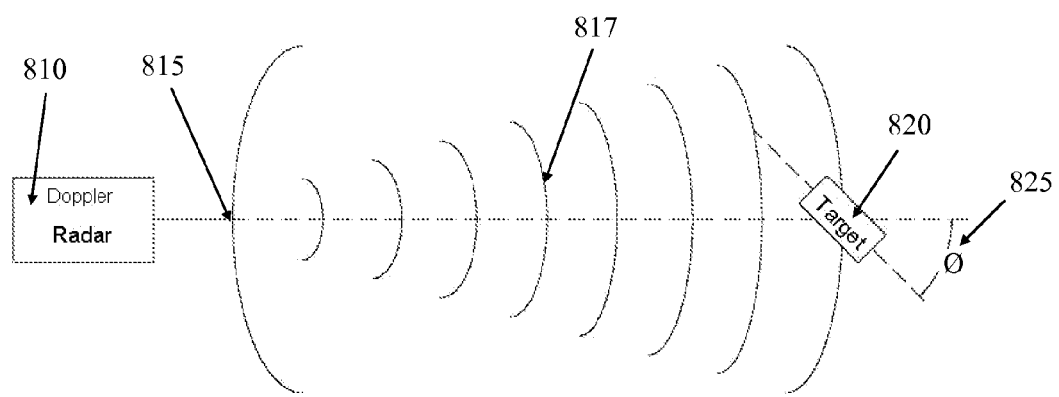
FIG. 8 is a representative diagram of Doppler shift according to one exemplary embodiment of the present invention.

FIG. 8 is a representative diagram of Doppler shift caused by relative motion of a target 820 in the field of view of the Doppler radar sensor 810 according to one exemplary embodiment of the present invention. Now referring to FIG. 8, the Doppler radar sensor 810 emits a microwave beam 817 from a transmitter 815. The microwave beam 817 is emitted at a first frequency and travels through the monitored area. The microwave beam 817 is reflected back to the transmitter 815 by the moving target 820. This reflected microwave beam, however, has a shift in frequency, which results in a second frequency. The Doppler radar sensor 810 utilizes this principal. The amount of frequency shift is directly proportional to the target's velocity relative to the Doppler radar sensor's transmitter 815. A similar effect at audible frequencies occurs when an automobile horn is moving with respect to the observer and decreases as it moves away from him. FIG. 8 presents an example of the target 820 approaching a Doppler radar sensor 810, where the target's path forms an angle Ø 825 with respect to the direction of the microwave beam 817. In one exemplary embodiment, the Doppler frequency shift ($F_D$) is determined by the following formula:

$$F_D = 2V(F_0/C)\cos Ø,$$

Where
 $F_0$=transmitter frequency (Hertz)
 C=velocity of light ($3\times10^8$ meters per second)
 V=velocity of the target (meters per second)
 Ø=angle between direction of microwave beam and target's path According to the above provided formula, if Ø is ninety degrees, which occurs when the target 120 is moving perpendicular to the direction of the microwave beam 817, $F_D$ is equal to zero. Thus, there is no Doppler frequency shift. Conversely, if Ø is zero degrees, which occurs when the target 120 is moving parallel to the direction of the microwave beam 817, $F_D$ is equal to $2V(F_0/C)$. Thus, the maximum attainable Doppler frequency shift is achieved.

Figure 9:
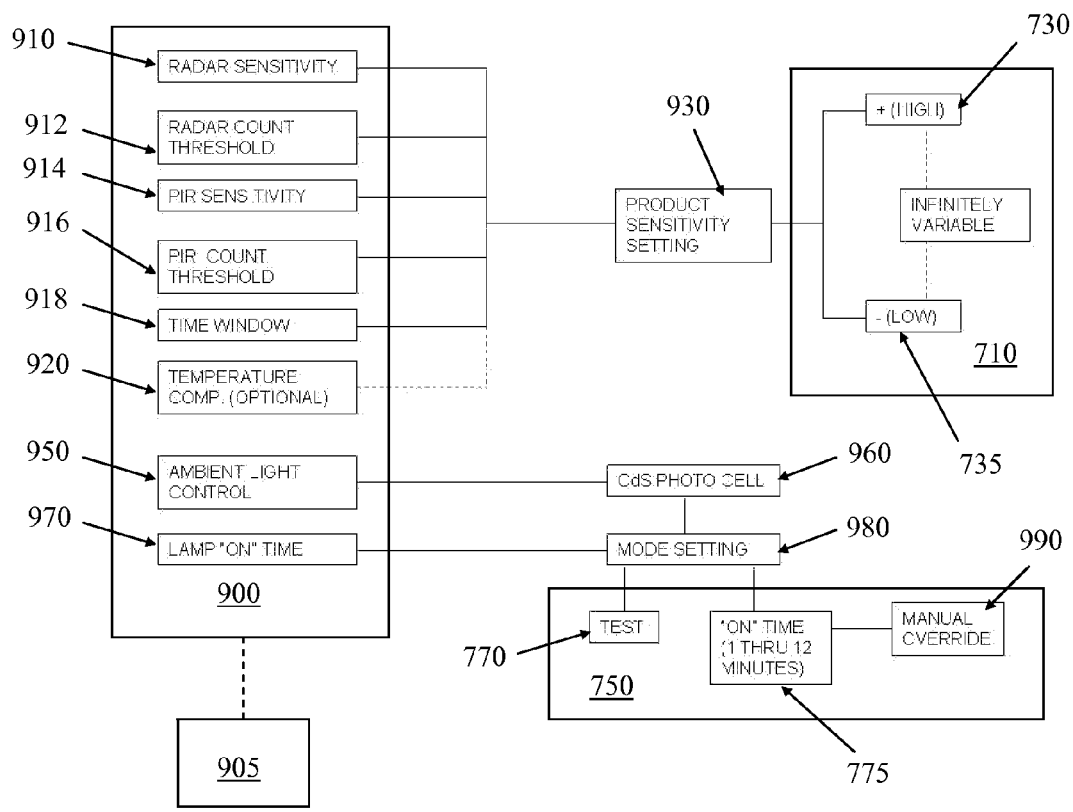
FIG. 9 is a representative table of motion detection variables for the microprocessor of the combination Doppler radar/PIR motion sensor according to one exemplary embodiment of the present invention.

FIG. 9 is a representative table of motion detection variables 900 for the microprocessor of the combination Doppler radar/PIR motion sensor according to one exemplary embodiment of the present invention. One or more of these motion detection variables 900 are implemented in the microprocessor of the combination Doppler radar/PIR motion sensor and are adjustable based on the needs or desires of the particular implementation. Referring now to FIG. 9, in one exemplary embodiment, the motion detection variables 900 include radar sensitivity variable 910, radar count threshold variable 912, PIR sensitivity variable 914, PIR count threshold variable 916, time window variable 918, temperature compensation variable 920, ambient light control variable 950, and lamp "on" time variable 970.

Anyone of the radar sensitivity variable 910, the radar count threshold variable 912, the PIR sensitivity variable 914, the PIR count threshold variable 916, the time window variable 918, and the temperature compensation variable 920 are adjustable and capable of changing the motion detector system's 100 sensitivity setting 930. In one exemplary embodiment, the sensitivity setting 930 is manually adjustable using sensitivity setting control knob 710 located on the housing 180. The radar sensitivity variable 910 is typically set to a higher value when the sensitivity setting control knob 710 is set to a higher setting and a lower value when the sensitivity setting control knob 710 is set to a lower sensitivity setting. As previously mentioned, the exemplary radar sensitivity variable 910 is adjustable infinitely within the range of the "+" setting 730, or maximum sensitivity setting, and the "−" setting 735, or minimum sensitivity setting. The radar count threshold variable 912 represents the number of events needed within a window of time to trigger detection using the Doppler radar sensor. For example, if the time window variable 918 is set to three seconds and the radar count threshold variable 912 is set to four events, the Doppler radar sensor triggers detection only when four motion events have occurred within the three second window.

Similarly, the PIR sensitivity variable 914 is typically set to a higher value when the sensitivity setting control knob 710 is set to a higher setting and a lower value when the sensitivity setting control knob 710 is set to a lower sensitivity setting. As previously mentioned, the PIR sensitivity variable 912 is adjustable infinitely within the range of the "+" setting 730, or maximum sensitivity setting, and the "−" setting 735, or minimum sensitivity setting. The PIR count threshold variable 916 represents the number of events needed within a window of time to trigger detection using the PIR sensor. For example, if the time window variable 918 is set to three seconds and the PIR count threshold variable 916 is set to three events, the PIR sensor triggers detection only when three motion events have occurred within the three second window.

The time window variable 918 further reduces the chance of false positives. In exemplary operation, both sensors, the Doppler radar sensor and the PIR sensor, are set to require a minimum number of motion events over some period of time. In one exemplary embodiment, the time window variable 918 is adjusted in the software to either allow the motion detector system 100 to trigger detection the instant any motion is detected, or require the motion detector system 100 to wait until a set number of events are recorded within a set time period before triggering detection. Upon triggering detection, the lamps 150 are turned on. For example, if the radar count threshold variable 912 is set to four and the time window variable 918 is set to three seconds, the motion detector system 100 will not trigger detection until the Doppler radar sensor senses four motion events occurring within a rolling three second period of time. Similarly, if the PIR count threshold variable 916 is set to three and the time window variable 918 is set to three seconds, the motion detector system 100 will not trigger detection until the PIR sensor senses three motion events occurring within a rolling three second period of time. Using the time window variable 918 allows both increased sensitivity and improved false positive rejection. Spurious motion events are typically rejected by increasing the radar count threshold variable 912 or the PIR count threshold variable 916, while overall sensitivity is retained by "remembering" events over some window of time, which is set by the time window variable 918. However, using a longer time window variable 918 with a higher radar count threshold variable 912 and a higher PIR count threshold variable 916 will delay detection of motion.

The temperature compensation variable 920 is used to adjust the PIR sensitivity 914 to compensate for the ambient temperature. When the ambient temperature is significantly colder than bodies in the field of view, the PIR sensors create a large signal. When the ambient temperature is the same as the surface temperature of bodies or their exterior clothing in the field of view, the PIR sensors do not produce a signal. In one exemplary embodiment, as the ambient temperature approaches 37° C., which is approximately human body temperature, temperature compensation variable 920 automatically increases the PIR sensitivity 914. In one exemplary embodiment, the ambient temperature compensation variable 920 can be turned off or on based on the particular needs and desires of the user.

Each of the ambient light control variable 950 and the lamp "on" time variable 970 is adjustable to change the motion detector system's 100 mode setting 980. In one exemplary embodiment, the mode setting 980 is manually adjustable using mode setting control knob 750 located on the housing 180. The mode setting control knob 750 is used to select different modes, including a test mode 770 and a "1 m through 12 m" night time setting 775. The ambient light control variable 950 is typically turned off when the test mode 770 is selected. When the mode setting control knob 750 is at or between the exemplary 1 minute and 12 minute mode, the ambient light control variable 950 is activated. In one exemplary embodiment, the motion detector system 100 is capable of a setting whereby it will detect a motion event only when the ambient light is below the specified threshold set in the microprocessor.

The lamp "on" time variable 970 is used to adjust the length of on time specified when the test mode 770 is selected. However, when the "1 m through 12 m" night time setting 775 is selected, the length of lamp on time is adjustable between 1 minute and 12 minutes. However, other time periods between 1 second and 1 hour are contemplated and within the scope of the present invention. For example, when the mode setting control knob 750 is set to 1 minute, the lamp 150 stays on for one minute after sufficient motion is detected. If the mode setting control knob 750 is set half way between 1 m and 12 m, the lamp 150 stays on for approximately six minutes when sufficient motion is detected. A manual override 990 is provided to override the "1 m through 12 m" night time setting 775 so that the lamps 150 are immediately turned on when the manual override 990 is pressed. The amount of time that the lamps 150 are turned on is selected by the user depending upon the setting of the "1 m through 12 m" night time setting 775. However, in other exemplary embodiments, the manual override 990 turns the lamps 150 on for a desired time, which can be factory programmed or set by the user based upon another timing switch (not shown).

In certain exemplary embodiments, the motion detection variables 900 are adjustable using a device 905 that is either hard-wired to the motion detection system 100 or wirelessly coupled to the motion detection system 100. In some exemplary embodiments, the device 905 is wirelessly coupled to the motion detection system 100 using BLUETOOTH® technology, which is a technology using a short range radio wave wireless communication device having a range limited to thirty feet. Thus, in these exemplary embodiments, the motion detection system 100 also includes BLUETOOTH® communication capability, whereby a consumer can make adjustments to the sensitivity settings 930 and mode settings 980 of the motion detector system 100 from their computer or BLUETOOTH® capable device 905, which is a short range radio wave wireless communication device having a range limited to thirty feet. The BLUETOOTH® communication feature allows the consumer to make adjustments to the sensor features without climbing a ladder to reach the bottom of the housing 180, such as is shown in FIG. 7. The exemplary motion detector system 100 also provides the ability to create custom settings, or export data, instead of requiring the consumer to use the normal pre-programmed setting(s) programmed into in the microprocessor. Accordingly, BLUETOOTH® connectivity with the microprocessor allows the consumer to perform various functions from their computer or other BLUETOOTH® capable device 905. These functions include, but are not limited to, adjusting Doppler radar and/or PIR sensor sensitivity of each technology independently, adjusting the window of time used for detecting motion events, adjusting the count threshold for Doppler radar and PIR sensors individually, turning on/off or adjusting the temperature compensation, adjusting the ambient light control, exporting motion detection data to a computer to record the motion events to a spreadsheet, and sending a signal to a BLUETOOTH® enabled camera that may or may not be coupled to the motion detection system 100 to record a photo or movie of the motion event to the computer, a VCR, a DVD, a DVR or other similar recording device. The function involving the recordation of data events allows recording the start/stop time of each motion event every time the motion detector system 100 detects motion plus all of the settings can be recorded at the time of the event along with the strength of signal.

Figure 10:
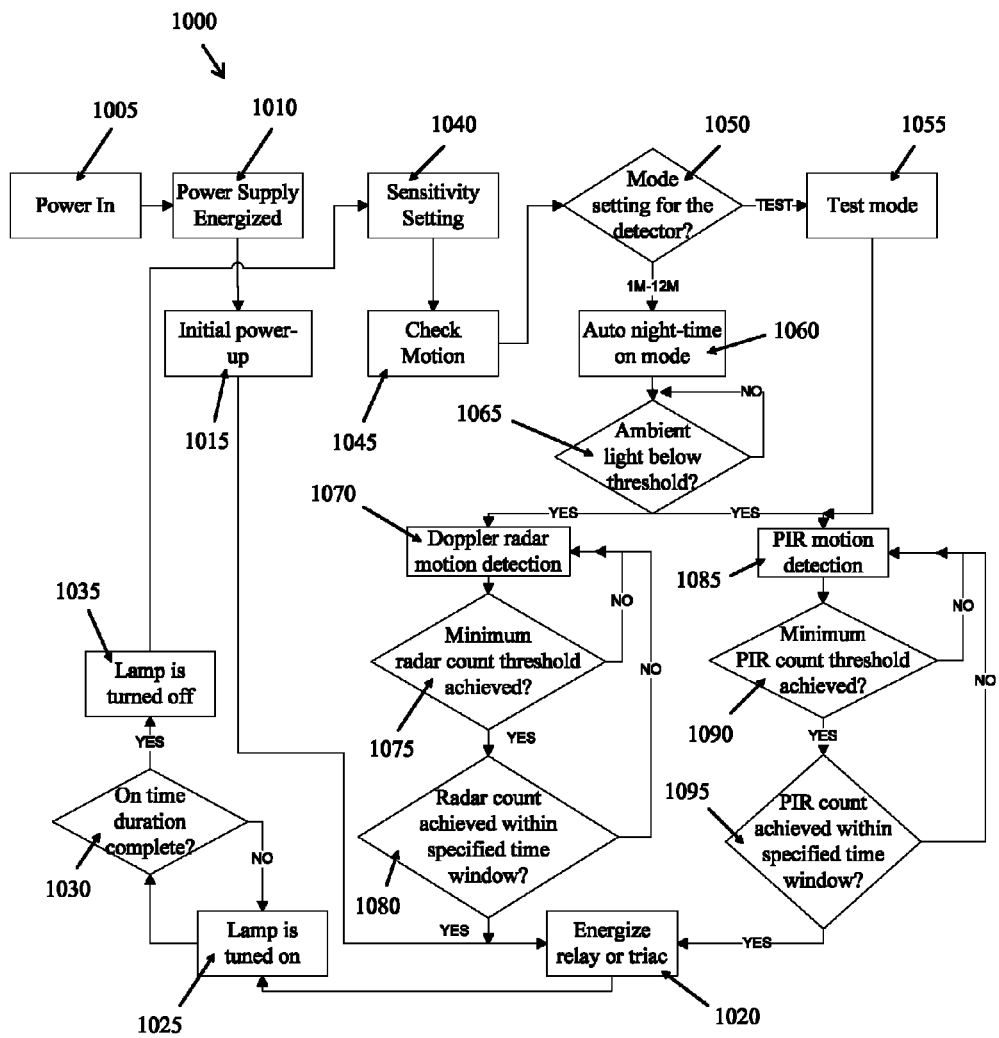
FIG. 10 is a flowchart illustrating the combination Doppler radar/PIR motion sensor operation according to one exemplary embodiment of the present invention.

FIG. 10 is a flowchart illustrating an operating method 1000 for the combination Doppler radar/PIR motion sensor according to one exemplary embodiment of the present invention. Those of ordinary skill in the art will recognize that the exemplary method disclosed in FIG. 10 can be modified to include greater or fewer steps. Further, the order of the steps, as shown, in FIG. 10 is for exemplary purposes only. The order can be modified in many different ways while still achieving the objectives of the present invention.

Referring now to FIGS. 1, 2, 3, 7, 9 and 10, the operating method 1000 starts at step 1005, where the power to the motion detector system 100 is turned on. The power circuit (not shown), located on the main circuit board 250 within the housing 180, is energized at step 1010. The motion detector system 100 is supplied power and undergoes an initial power-up at step 1015. The relay or triac (not shown) is energized at step 1020, and the lamp 150 is turned on at step 1025. A determination is made at step 1030 as to whether the lamps 150 have been on for the complete duration. This duration is pre-set at the factory, but can be changed subsequently by the user. Additionally, the complete duration may vary depending upon whether the motion detector system 100 is in the test mode 770 or whether it is in the 1 m-12 m setting mode 775. If the duration is not complete, the lamps 150 remain on until the determination is made at step 1030 that the lamps 150 have been on for the complete duration. The lamps 150 are then turned off at step 1035.

The sensitivity 710 is adjustable by the user at step 1040. The motion detector system 100 checks for motion within the monitored area 300 at step 1045 based upon the settings for the sensitivity 710 and the mode 750. The mode setting 750 is determined at step 1050, which can be adjusted by the user. The mode setting 750 is determined to be either test mode 770, which is at step 1055, or "1 m through 12 m" night time setting 775, or auto night-time mode, which is at step 1060. When the mode setting control knob 755 is positioned at the test mode 770, the photocell is turned off and the motion detector system 100 checks for motion using the Doppler radar sensor at step 1070 and the PIR sensor 210 at step 1085. However, when the mode setting control knob 755 is positioned anywhere within the 1 m-12 m setting 775, the photocell is turned on and determines if the ambient light is below the specified threshold set in the processor at step 1065. If the ambient light is not below the specified threshold, the determination process continuously recycles until the ambient light is below the specified threshold. When the ambient light is below the specified threshold, the motion detector system 100 checks for motion using the Doppler radar sensor at step 1070 and the PIR sensor 210 at step 1085.

The Doppler radar sensor starts detecting motion at step 1070. A determination is made at step 1075 as to whether the minimum radar count threshold 912 has been achieved. If the minimum radar count threshold 912 is not achieved, the process recycles to step 1070 until it is determined that the minimum radar count threshold 912 is achieved at step 1075. A determination also is made as to whether the minimum radar count threshold 912 was achieved within a specified time window 918 at step 1080. If the minimum radar count threshold 912 was not achieved within the specified time window 918, the process recycles back to step 1070. If the minimum radar count threshold 912 was achieved within the specified time window 918, the relay or triac is energized at step 1020. The lamp 150 is turned on at step 1025. Once a determination is made at step 1030 that the lamp 150 has been on for the complete duration, the lamp 150 is turned off at step 1035. The motion detector system 100 again determines the sensitivity setting at step 1040 and begins detecting for motion at step 1045. Here, the complete duration for lamp "on" time 970 is determined according to where the mode setting control knob 750 is positioned.

The PIR sensor 210 starts detecting motion at step 1085. A determination is made at step 1090 as to whether the minimum PIR count threshold 916 has been achieved. If the minimum PIR count threshold 916 is not achieved, the process recycles to step 1085 until it is determined that the minimum PIR count threshold 916 is achieved at step 1090. A determination also is made as to whether the minimum PIR count threshold 916 was achieved within a specified time window 918 at step 1095. If the minimum PIR count threshold 916 was not achieved within the specified time window 918, the process recycles back to step 1085. If the minimum PIR count threshold 916 was achieved within the specified time window 918, the relay or triac is energized at step 1020. The lamp 150 is turned on at step 1025. Once a determination is made at step 1030 that the lamp 150 has been on for the complete duration, the lamp 150 is turned off at step 1035. The motion detector system 100 again determines the sensitivity setting at step 1040 and begins detecting for motion at step 1045. Here, the complete duration for lamp "on" time 970 is determined according to where the mode setting control knob 750 is positioned. According to the operating method 1000, the relay or triac is energized at step 1020 when either the Doppler radar sensor or the PIR sensor 210 detects that there is motion within the monitored area 300.

Although each exemplary embodiment has been described in detail, it is to be construed that any features and modifications that are applicable to one embodiment are also applicable to the other embodiments.

Although the invention has been described with reference to specific embodiments, these descriptions are not meant to be construed in a limiting sense. Various modifications of the disclosed embodiments, as well as alternative embodiments of the invention will become apparent to persons of ordinary skill in the art upon reference to the description of the exemplary embodiments. It should be appreciated by those of ordinary skill in the art that the conception and the specific embodiments disclosed may be readily utilized as a basis for modifying or designing other structures or methods for carrying out the same purposes of the invention. It should also be realized by those of ordinary skill in the art that such equivalent constructions do not depart from the spirit and scope of the invention as set forth in the appended claims. It is therefore, contemplated that the claims will cover any such modifications or embodiments that fall within the scope of the invention.

What is claimed is:

1. A motion detector system for monitoring motion within a monitored area, comprising:
   an outdoor light fixture comprising one or more light sources;
   at least one sensor disposed within the light fixture, wherein the sensor receives at least one signal from the monitored area; and
   a microprocessor electrically coupled to the sensor, the microprocessor analyzing the signal based upon a sensitivity setting or a mode setting to determine whether a trigger event exists,
   wherein the sensitivity setting or the mode setting is adjustable wirelessly, and
   wherein the at least one sensor is selected from a PIR sensor or a Doppler radar sensor.

2. The motion detector system of claim 1, wherein the sensitivity setting or the mode setting is adjustable using a short range radio wave wireless communication device having a range limited to thirty feet.

3. The motion detector system of claim 1, wherein the sensitivity setting comprises at least one of a radar sensitivity variable, a radar count threshold variable, a PIR sensitivity variable, a PIR count threshold variable, a time window variable, or a temperature compensation variable.

4. The motion detector system of claim 1, wherein the microprocessor controls operation of the light sources based upon the mode setting.

5. The motion detector system of claim 4, wherein the mode setting comprises at least one of an ambient light control variable or a lamp "on" time variable.

6. The motion detector system of claim 1, wherein the at least one sensor comprises at least one PIR sensor.

7. The motion detector system of claim 1, wherein the at least one sensor comprises at least one Doppler radar sensor.

8. The motion detector system of claim 1, wherein the microprocessor changes an intensity of the light source based on a determination that the trigger event exists.

9. The motion detector system of claim 1, wherein at least one light source comprises a light emitting diode (LED).

10. The motion detector system of claim 1, further comprising a camera coupled to the light fixture for recording one or more motion detection data upon the determination of the trigger event by the microprocessor, wherein the motion detector system transmits one or more motion detection data based upon the signal to a remote device.

11. The motion detector system of claim 10, wherein the remote device comprises at least one of a computer, a VCR, a DVD, a DVR, or a short range radio wave wireless communication device having a range limited to thirty feet.

12. A method for adjusting a setting of a motion detector system, the motion detector system, comprising:
    an outdoor light fixture comprising one or more light sources;
    at least one sensor disposed within the light fixture, wherein the sensor receives at least one signal from a monitored area; and
    a microprocessor electrically coupled to the sensor, the microprocessor analyzing the signal based upon at least one sensitivity setting to determine whether a trigger event exists within the monitored area,
    wirelessly changing at least one sensitivity setting using a wireless device, and
    wherein the at least one sensor is selected from a PIR sensor or a Doppler radar sensor.

13. The method of claim 12, wherein the sensitivity setting comprises at least one of a radar sensitivity variable, a radar count threshold variable, a PIR sensitivity variable, a PIR count threshold variable, a time window variable, or a temperature compensation variable.

14. The method of claim 12, wherein the at least one sensor is a Doppler radar sensor.

15. The method of claim 12, wherein the motion detector system comprises a camera for recording one or more motion detection data upon the determination of the trigger event by the microprocessor, and wirelessly transmitting one or more motion detection data based upon the signal to a remote device.

16. A motion detector system for monitoring motion within a monitored area, comprising:
    an outdoor light fixture comprising one or more light sources;
    at least one sensor disposed within the light fixture, wherein the sensor receives at least one signal from the monitored area;
    a microprocessor electrically coupled to the sensor, the microprocessor analyzing the signal based upon a sensitivity setting to determine whether a trigger event exists, and
    a camera coupled to the light fixture for recording one or more motion detection data upon the determination of the trigger event by the microprocessor,
    wherein the motion detector system transmits one or more motion detection data based upon the signal to a remote device, and
    wherein the at least one sensor is selected from a PIR sensor or a Doppler radar sensor.

17. The motion detector system of claim 16, wherein the remote device comprises a wireless device.

18. The motion detector system of claim 17, wherein the remote device comprises at least one of a computer, a VCR, a DVD, a DVR, or a short range radio wave wireless communication device having a range limited to thirty feet.

19. The motion detector system of claim 16, wherein the at least one sensor is a Doppler radar sensor.

20. The motion detector system of claim 16, wherein the microprocessor changes an intensity of the light source based on a determination that the trigger event exists.

* * * * *